Figure 3:
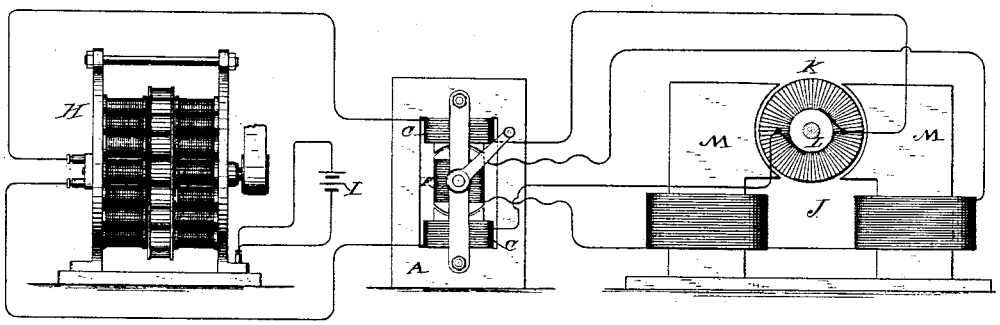

(No Model.)  2 Sheets—Sheet 1.
N. TESLA.
REGULATOR FOR ALTERNATE CURRENT MOTORS.
No. 390,820. Patented Oct. 9, 1888.
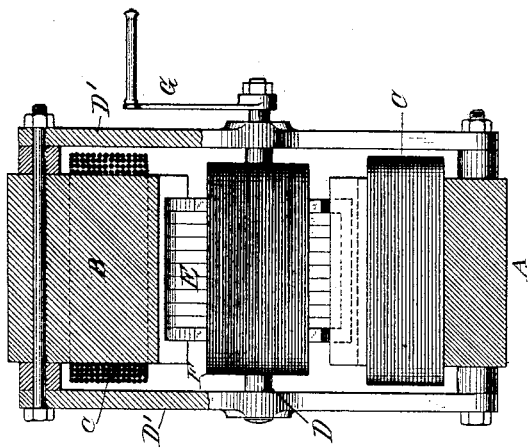
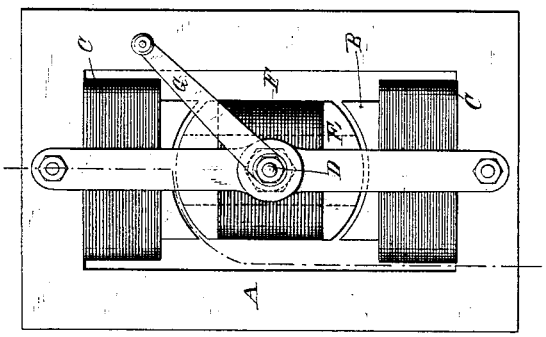
WITNESSES:
Raphaël Netter
Robt. F. Gaylord
INVENTOR.
Nikola Tesla
BY
Duncan, Curtis & Page.
ATTORNEYS, (No Model.) 2 Sheets—Sheet 2.

N. TESLA.
REGULATOR FOR ALTERNATE CURRENT MOTORS.

No. 390,820. Patented Oct. 9, 1888.

WITNESSES:
Raphaël Netter
Robt. F. Gaylord

INVENTOR.
Nikola Tesla
BY
Duncan, Curtis & Page.
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

REGULATOR FOR ALTERNATE-CURRENT MOTORS.

SPECIFICATION forming part of Letters Patent No. 390,820, dated October 9, 1888.

Application filed April 24, 1888. Serial No. 271,682. (No model.)

*To all whom it may concern:*

Be it known that I, NIKOLA TESLA, a subject of the Emperor of Austria, from Smiljan, Lika, border country of Austria-Hungary, now residing in New York, in the county and State of New York, have invented certain new and useful Improvements in Regulators for Alternating-Current Motors, of which the following is a specification, reference being had to the drawings accompanying and forming part of the same.

My invention is an improvement in systems for the electric transmission of power; and it consists in a means of regulating the speed and power of the motor or motors. The system for use with which the invention is more particularly designed is one in which the motors, or what may be in certain cases their equivalents—the electrical transformers—have two or more independent energizing-circuits, which, receiving current from corresponding sources, act to set up a progressive movement or shifting of the magnetic poles of the motors; but the invention is also applicable to other purposes, as will hereinafter appear. I employ the regulator for the purpose of varying the speed of these motors.

The regulator proper consists of a form of converter or transformer with one element capable of movement with respect to the other, whereby the inductive relations may be altered, either manually or automatically, for the purpose of varying the strength of the induced current. I prefer to construct this device in such manner that the induced or secondary element may be movable with respect to the other; and the improvement, so far as relates merely to the construction of the device itself, consists, essentially, in the combination, with two opposite magnetic poles, of an armature wound with an insulated coil and mounted on a shaft, whereby it may be turned to the desired extent within the field produced by the poles. The normal position of the core of the secondary element is that in which it most completely closes the magnetic circuit between the poles of the primary element, and in this position its coil is in its most effective position for the inductive action upon it of the primary coils; but by turning the movable core to either side the induced currents delivered by its coil become weaker until, by a movement of the said core and coil through ninety degrees, there will be no current delivered.

The construction of this device, broadly, I do not claim as of my invention; but this, together with the manner of applying and using the same, which forms the subject of my invention, I will now explain by reference to the accompanying drawings.

Figure 4:
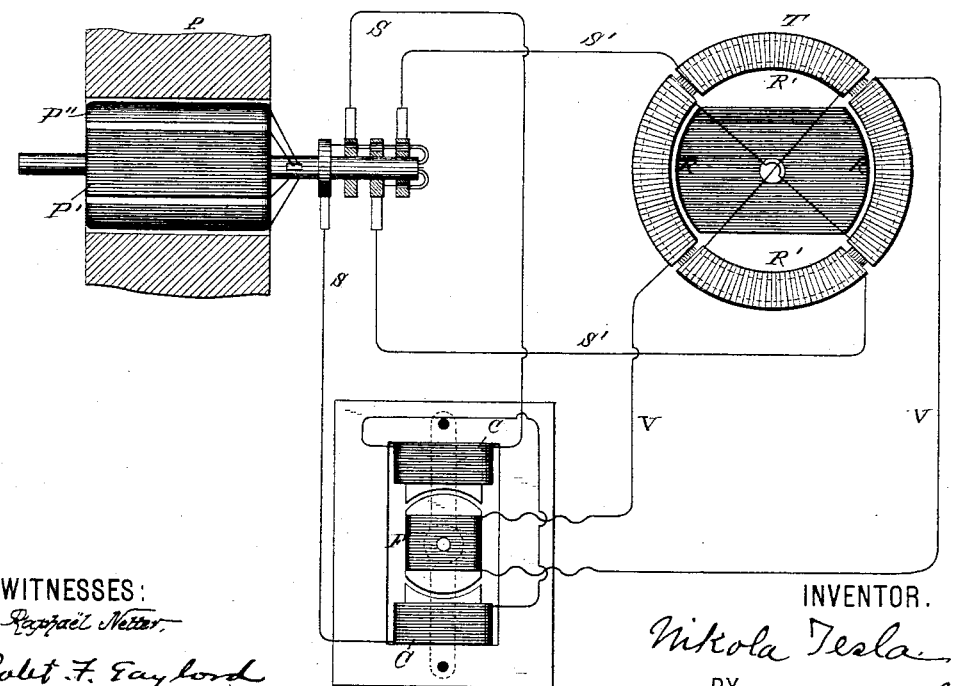

Figure 1 is a view in side elevation of the regulator. Fig. 2 is a broken section on line $x\ x$ of Fig. 1. Fig. 3 is a diagram illustrating the preferred manner of applying the regulator to ordinary forms of motors, and Fig. 4 is a similar diagram illustrating the application of the device to my improved alternating-current motors.

The regulator may be constructed in many ways to secure the desired result; but in the best form of which I am now aware it is shown in Figs. 1 and 2.

A represents a frame of iron, and I would here state that the plan which is now invariably followed of dividing up all iron cores which are subjected to the influence of alternating currents should be adopted in the construction of this device.

B B are the cores of the inducing or primary coils C C, said cores being integral with or bolted to the frame A in any well-known way.

D is a shaft mounted in the side bars, D', and on which is secured a sectional iron core, E, wound with an induced or secondary coil, F, the convolutions of which are parallel with the axis of the shaft. The ends of the core are rounded off, so as to fit closely in the space between the two poles and permit the core E to be turned. A handle, G, secured to the projecting end of the shaft D, is provided for this purpose.

Any means may be employed for maintaining the core and secondary coil in any given position to which it is turned by the handle.

The operation or effect of the device will be understood by reference to the diagrams illustrating the manner of its application.

In Fig. 3, let H represent an ordinary alternating-current generator, the field-magnets of which are excited by a suitable source of current, I. Let J designate an ordinary form of electro-magnetic motor provided with an armature, K, commutator L, and field-magnets M. It is well known that such a motor, if its field-magnets' cores be divided up into insulated sections, may be practically operated by an alternating current; but in using my regulator with such a motor I include one element of the motor only—say the armature-coils—in the main circuit of the generator, making the connections through the brushes and the commutator in the usual way. I also include one of the elements of the regulator—say the stationary coils—in the same circuit, and in the circuit with the secondary or movable coil of the regulator I connect up the field-coils of the motor. I prefer to use flexible conductors to make the connections from the secondary coil of the regulator, as I thereby avoid the use of sliding contacts or rings without interfering with the requisite movement of the core E.

If the regulator be in its normal position, or that in which its magnetic circuit is most nearly closed, it delivers its maximum induced current, the phases of which so correspond with those of the primary current that the motor will run as though both field and armature were excited by the main current.

To vary the speed of the motor to any rate between the minimum and maximum rates, the core E and coils F are turned in either direction to an extent which produces the desired result, for in its normal position the convolutions of coil F embrace the maximum number of lines of force, all of which act with the same effect upon said coil; hence it will deliver its maximum current; but by turning the coil F out of its position of maximum effect the number of lines of force embraced by it is diminished. The inductive effect is therefore impaired, and the current delivered by coil F will continue to diminish in proportion to the angle at which the coil F is turned until, after passing through an angle of ninety degrees, the convolutions of the coil will be at right angles to those of coils C C, and the inductive effect reduced to a minimum.

Incidentally to certain constructions, other causes may influence the variation in the strength of the induced currents. For example, in the present case it will be observed that by the first movement of coil F a certain portion of its convolutions are carried beyond the line of the direct influence of the lines of force, and that the magnetic path or circuit for said lines is impaired; hence the inductive effect would be reduced. Next, that after moving through a certain angle, which is obviously determined by the relative dimensions of the bobbin or coil F, diagonally-opposite portions of the coil will be simultaneously included in the field, but in such positions that the lines which produce a current-impulse in one portion of the coil in a certain direction will produce in the diagonally-opposite portion a corresponding impulse in the opposite direction; hence portions of the current will neutralize one another.

As before stated, the mechanical construction of the device may be greatly varied; but the essential conditions of the invention will be fulfilled in any apparatus in which the movement of the elements with respect to one another effects the same results by varying the inductive relations of the two elements in a manner similar to that described.

It may also be stated that the core E is not indispensable to the operation of the regulator; but its presence is obviously beneficial. This regulator, however, has another valuable property in its capability of reversing the motor, for if the coil F be turned through a half-revolution the position of its convolutions relatively to the two coils C C and the lines of force is reversed, and consequently the phases of the current will be reversed. This will produce a rotation of the motor in an opposite direction. This form of regulator is also applied with great advantage to my system of utilizing alternating currents, in which the magnetic poles of the field of a motor are progressively shifted by means of the combined effects upon the field of magnetizing-coils included in independent circuits, through which pass alternating currents in proper order and relations to each other.

In illustration, let P represent one of my generators having two independent coils, P' and P'', on the armature, and T a diagram of a motor having two independent energizing-coils or sets of coils, R R'. One of the circuits from the generator, as S' S', includes one set, R' R', of the energizing-coils of the motor, while the other circuit, as S S, includes the primary coils of the regulator. The secondary coil of the regulator includes the other coils, R R, of the motor.

While the secondary coil of the regulator is in its normal position it produces its maximum current, and the maximum rotary effect is imparted to the motor; but this effect will be diminished in proportion to the angle at which the coil F of the regulator is turned. The motor will also be reversed by reversing the position of the coil with reference to the coils C C, and thereby reversing the phases of the current produced by the generator. This changes the direction of the movement of the shifting poles which the armature follows.

One of the main advantages of this plan of regulation is its economy of power. When the induced coil is generating its maximum current, the maximum amount of energy in the primary coils is absorbed; but as the induced coil is turned from its normal position the self-induction of the primary coils reduces the expenditure of energy and saves power.

It is obvious that in practice either coils C C or coil F may be used as primary or secondary, and it is well understood that their relative proportions may be varied to produce any desired difference or similarity in the inducing and induced currents.

I am aware that it is not new to vary the secondary current of an induction-coil by moving one coil with respect to the other, and thereby varying the inductive relations normally existing between the two. This I do not claim.

What I claim is—

1. The combination, with a motor having independent energizing-circuits, of an alternating-current regulator, consisting, essentially, of inducing and induced coils movable with respect to one another, whereby the strength of the induced currents may be varied, the induced coils being included in and adapted to supply the current for one of the motor-circuits, as set forth.

2. The combination, with a motor adapted to be run or operated by alternating currents and provided with independent energizing-coils, of a regulator consisting of stationary inducing-coils and an induced coil capable of being rotated, whereby it may be turned to a greater or less angle to the primary coils, or its position with respect thereto reversed, the induced coil or coils being included in and adapted to supply the current for one of the motor-circuits, as set forth.

NIKOLA TESLA.

Witnesses:
 ROBT. F. GAYLORD,
 FRANK B. MURPHY.